July 8, 1958
R. C. CLOUGH ET AL
2,841,822
MOLDING APPARATUS
Filed June 29, 1954
3 Sheets-Sheet 1
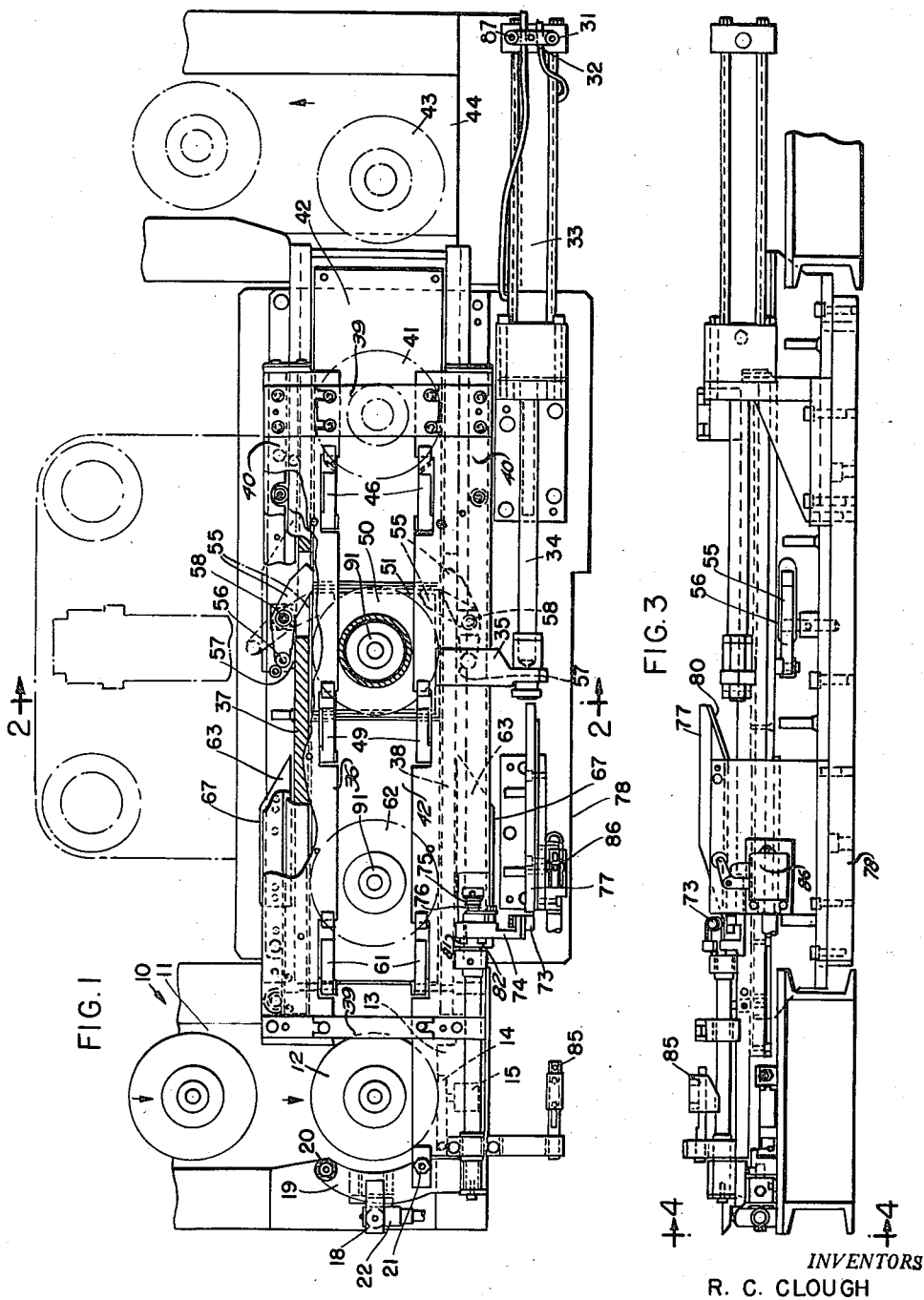
INVENTORS:
R. C. CLOUGH
R. B. GRAF
J. F. KRUZIC
BY C. B. Hamilton
ATTORNEY

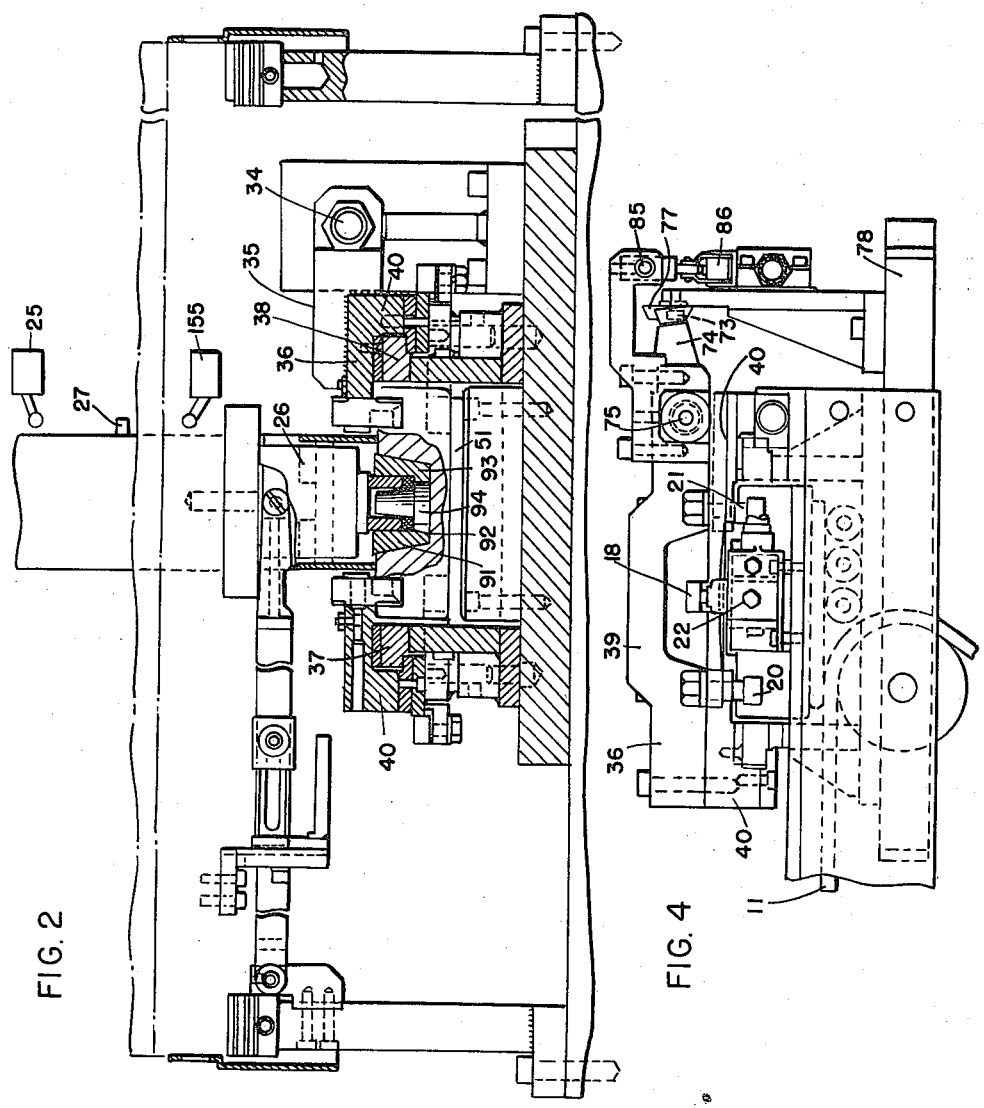

July 8, 1958 R. C. CLOUGH ET AL 2,841,822
MOLDING APPARATUS
Filed June 29, 1954 3 Sheets-Sheet 3

INVENTORS:
R. C. CLOUGH
R. B. GRAF
J. F. KRUZIC
BY C. B. Hamilton
ATTORNEY

United States Patent Office 2,841,822
Patented July 8, 1958

2,841,822

MOLDING APPARATUS

Robert C. Clough, Lombard, Richard B. Graf, Downers Grove, and John F. Kruzic, North Riverside, Ill., assignors to Western Electric Company, Incorporated, New York, N. Y., a corporation of New York Application June 29, 1954, Serial No. 440,152

5 Claims. (Cl. 18—16)

This invention relates to molding apparatus, and more particularly to apparatus for feeding molds to and through a molding press.

In the manufacture of articles, such as cores composed of magnetic dust compacted together and baked, the articles are sometimes molded by filling boat-like dies with powdered material, placing pressure elements on the material and feeding the boats one after another to and through a press which compresses the material; after which the boats are removed and the compressed powdered material rings are extracted from the dies. In the past, there has been no apparatus for rapidly and surely feeding boats to and through the press and compressing the powdered materials.

An object of the invention is to provide new and improved molding apparatus.

Another object of the invention is to provide apparatus for feeding molds to and through a press.

A further object of the invention is to provide apparatus for feeding boat-like molds containing powdered material into a press, actuating the press and carrying the molds from the press.

An apparatus illustrating certain features of the invention may include a press having a stationary lower platen and an upper ram movable toward and away from the lower platen. A guideway extends transversely across the platen and a pusher mechanism may be provided for pushing portable dies to a molding position between the platen and the ram. The pusher mechanism may include a plurality of escapements positioned therealong for pushing a plurality of spaced dies to and from the platen and includes cams for actuating stop arms at the platen to precisely locate each die under the ram.

A complete understanding of the invention may be obtained from the following detailed description of an apparatus forming a specific embodiment thereof, when read in conjunction with the appended drawings, in which Fig. 1 is a top plan view of a molding apparatus forming one embodiment thereof with portions thereof broken away and shown in section;

Fig. 2 is an enlarged, vertical section taken along line 2—2 of Fig. 1;

Fig. 3 is a fragmentary, side elevation of the apparatus shown in Fig. 1;

Fig. 4 is an enlarged, front elevation of the apparatus taken along the line 4—4 of Fig. 3.

Figure 5:
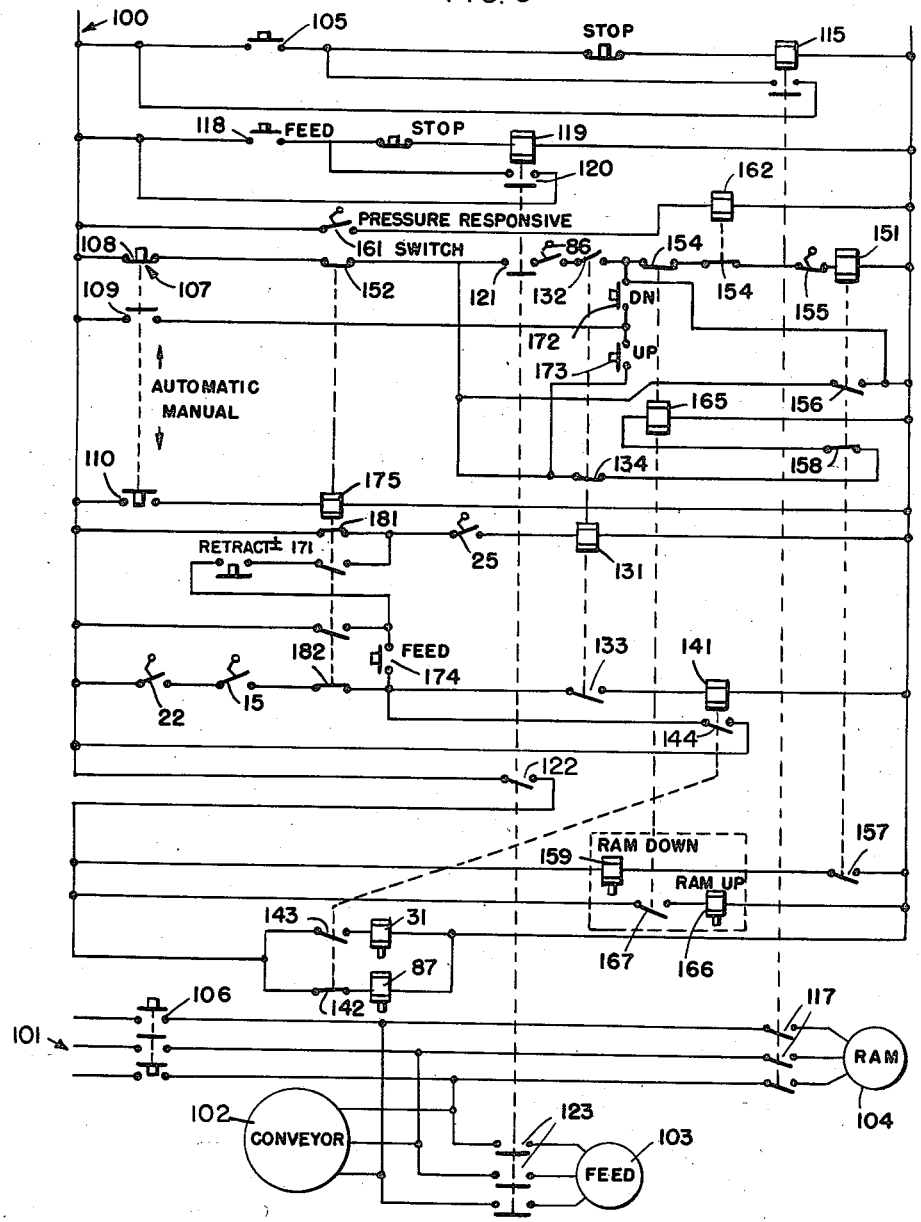
Fig. 5 is a diagrammatic view of a circuit for controlling the operation of the apparatus.

Referring now in detail to the drawings, there is shown therein a feed conveyor 10 (Fig. 1) including a continuously movable belt 11 which feeds molds or dies 12 against a stop 13. The die 12 swings an arm 14 as it reaches the stop 13 to actuate a microswitch 15. When the switch 15 has been thus closed and a plate 18 mounted on a pusher arm 19 having pushing rollers 20 and 21 actuates a microswitch 22 in series with the microswitch 15 and a microswitch 25 (Fig. 2) is actuated by the upper stroke of a ram 26 through a dog 27 carried thereby, a solenoid 31 of a four-way valve 32 of a well known type is energized to supply oil under pressure from the valve 32 to the lefthand end of a cylinder 33. This moves a piston rod 34 to the right, as viewed in Fig. 1. The piston rod is connected by a rigid arm 35, adjustably secured to the piston rod 34, to a slide 36 mounted on guideways 37 and 38. The slide includes bridges 39 rigidly connecting elongated shoes 40 fitting slidably on the guideways. The rod pulls the slide 36 to feed the die 41 along a guideway 42 from the position thereof shown in Fig. 1 to a position in which a die 43 is shown on a belt conveyor 44, the die 43 having been fed away from that position.

The die 41 is so moved by escapement pawls or arms 46 secured pivotally to the slide 36, and which permit the dies to be moved thereunder in a righthand direction relative to the pawls 46, but prevent movement of the dies in the lefthand direction relative to the pawls 46. Similarly, pawls 49 move a die 50 in the pressing position on a platen 51 below the ram 26 from the pressing position to the position occupied by the die 41. As the die 50 is moved from the pressing position, it swings lever arms 55 from their broken-line positions to their full-line positions out of the path thereof until followers 56 engage stops 57. The arms 55 are mounted on fixed pins 58. Also, escapement pawls 61 secured to the feed slide 36 move a die 62 from the position thereof shown in Fig. 1 to the pressing position, and as the die 62 approaches the pressing position, cams 63 fixed to the slide 36 engage the followers 56 and pivot the levers 55 to the broken-line positions thereof before the die 62 gets to the pressing position. Then the followers 56 ride along dwells 67 formed on the cams 63 and maintain the levers 55 in their broken-line positions while the die 62 is moved by the pawls 61 into engagement therewith, at which time the die 62 is precisely located between the ram 26 and the platen 51 for pressing powdered material contained therein.

During the movement of the slide 36 to the right, the feed arm 19 engages the die 12 and pushes it to the position occupied by the die 62 during the feeding stroke, and a cam follower 73 (Figs. 1, 3 and 4) carried on an arm 74, which is mounted pivotally on a shaft 75 and secured to the shaft 75 through a torsion spring 76, rides up and along a cam 77 fixed to a base 78. This causes the arm 74 to urge the shaft 75 in a direction urging the arm 19 to its lower or feeding position, the arm 19 being rigidly mounted on the shaft 75. The counterclockwise movement of the arm 19, as viewed in Fig. 4, is limited by suitable means (not shown) as, for example, a dog on the shaft and a stop on the slide 36. As the slide 36 reaches the end of its feed stroke, the follower roller 73 drops off the top of the cam 77 to a position aligned with a camming edge 80 of the cam 77. Also, when the slide 36 reaches the end of its feed stroke, an adjustable actuating rod 85 actuates a limit switch 86 secured to the base 78 to start the ram down, which energizes a solenoid 87 of the valve 32 to reverse the cylinder 33, and the piston rod 34 then is moved to the left, as viewed in Fig. 1, from its extreme righthand position. The shaft 75 is mounted rotatably on the slide 36, but is held against longitudinal movement relative to the slide.

As the slide 36 is moved to the left, the cam follower 73 moves under the cam 77 (Fig. 3) and pivots the shaft 75 through the torsion spring 76 and through intergaging lugs 81 and 82 on the shaft 75 and the arm 74 to lift the arm 19 and the rollers 20 and 21 up above the level of the die 12 which had been moved into a position engaging the stop 13, and as the slide 36 reaches its farthest left-hand position, the follower 73 clears the cam 77 to permit the arm 19 to drop to its feeding position behind the die 12, and the arm 19 actuates the switch 22. While the slide 36 is returning to its feed position, the ram 26 is moved downwardly through conventional hydraulic means (not shown) and presses a ring 91 (Fig. 4) downwardly to press powdered material 92 against a supporting ring 93 and a base 94 of a core 95 to form the ring precisely and compact it. As the pressure of the ram 26 builds up to a predetermined point, a standard well known pressure responsive switch 161 reverses the ram to retract it from the die 62, and the dog 27 carried by the ram actuates the switch 25, which again actuates the valve 32 to start the feed stroke of the slide 36 to repeat the above-described cycle of operation.

The control circuit shown on Fig. 5 includes a control powerline 100 and a three-phase powerline 101 designed to supply power to hydraulic pump motors 102, 103 and 104. Switches 105 and 106 are set manually in their closed positions, and a switch 107 is set manually in its automatic position in which contacts 108 are closed and contacts 109 and 110 are open. The switch 105 energizes a relay 115, which closes holding contacts 116 and contacts 117 to the motor 104 to provide a supply of oil under pressure for the ram 26. A momentary switch 118 also is closed manually to bring in a relay 119, which closes holding contacts 120 and closes contacts 121, 122 and 123. The contacts 123 start the motor 103 to provide a supply of oil under pressure for the cylinder 33. Starting of the motor 102 started the operation of the conveyors 11 and 44, and, assuming the dies 12, 62 and 50 to be in the positions in which they are shown in Fig. 1 and the ram 26 to be retracted, the ram 26 holds closed the limit switch 25 to energize a relay 131 to close contacts 132 and 133 and open contacts 134, and the die 12 and the plate 18 hold closed the limit switches 15 and 22. A relay 141 then is energized through the switches 15 and 22 and the contacts 133, and opens contacts 142 and closes contacts 143 and holding contacts 144 to deenergize the solenoid 87 and energize the solenoid 31. This reverses the valve 32 (Fig. 1) to start the feeding movement of the slide 36. As the slide reaches the end of its feeding movement, the actuator 85 closes the limit switch 86 to energize a relay 151 (Fig. 5) through contacts 108, 152, 121, 153 and 154 and a ram-overtravel-preventing limit switch 155. The relay 151 closes holding contacts 156 and contacts 157 and opens contacts 158. The closing of the contacts 157 actuates a solenoid 159 of a valve (not shown) controlling the ram to cause oil pumped by the motor 104 to force the ram down. The ram 26 closes on the die thereunder, and, when the pressure builds up on the ram, a pressure responsive switch 161 in the actuating oil line to the ram is actuated as the die resists the ram. The switch 161 brings in a relay 162 to open contacts 154 to drop out the relay 151. This deenergizes the solenoid 159 and energizes a relay 165 to energize a valve solenoid 166 through contacts 167 to reverse the ram.

When the ram was moved downwardly, the lug 27 permitted the limit switch 25 to open to drop out the relay 141 to deenergize the solenoid 31 and energize the solenoid 87 to retract the slide 36. Then, as the actuator 85 was moved away from the switch 86 to open it, the initial energizing circuit to the relay 151 is opened. After the ram is moved from the die, the switch 161 opens to drop out the relay 162 to set up the circuit to the relay 151 at the end of the next feeding stroke when the limit switch 86 is again closed. It is apparent that, as the slide 36 reaches its retracted position and a die 12 is fed to the lefthand end of the slide 36, the switches 15 and 22 are closed, and, the ram closing the switch 25, the cycle just described is repeated.

Switches 171, 172, 173 and 174 and a relay 175 are provided for manual operation of the die feeding mechanism and the ram when the switch 107 is moved to its manual position. The relay 175 opens contacts 152, 181 and 182 to block automatic operation, and closes contacts 183 and 184 to enable manual operation.

The above-described apparatus serves to automatically and surely feed the dies to the press, and operate the press without any possibility of jamming of the dies with the feeding mechanism or the ram.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A die feeding apparatus for a molding press comprising a guideway, an elongated slide reciprocable along the guideway between a retracted position and a feed position, a shaft mounted rotatably on the slide parallel to the guideway and held against longitudinal movement relative to the slide, a pusher arm mounted rigidly on the shaft, a follower arm mounted rotatably on the shaft, a follower roll mounted on the follower arm, lost-motion connecting means for limiting rotation of the follower arm relative to the shaft, an elongated cam extending along the guideway for pressing the roll in a direction such as to permit the pusher arm to extend over the guideway in engagement with a die on the guideway as the slide is moved from its retracted position to its feed position and for raising the pusher arm above the level of the die as the slide is moved from its feed position to its retracted position, means operable by the pusher arm as it moves to the level of the die as the slide reaches its retracted position for moving the slide in the opposite direction, and means operable by a die placed on the guideway adjacent to the pusher arm for permitting operation of the slide-moving means.

2. A die feeding apparatus for a molding press comprising a guideway leading substantially horizontally to the press, a slide reciprocable along the guideway between a retracted position and a feed position, a shaft mounted rotatably on the slide parallel to the guideway and held against longitudinal movement relative to the slide, a pusher arm mounted on the shaft for pushing a die along the guideway, a follower arm mounted on the shaft, and an elongated cam extending along the guideway along the top of which the follower arm travels to permit the pusher arm to extend over the guideway in engagement with the die as the slide is moved from its retracted position to its feed position and along the bottom of which the follower arm travels to raise the pusher arm above the level of the die as the slide is moved from its feed position to its retracted position.

3. A die feeding apparatus for a molding press comprising a horizontal die guide extending from a feed end thereof to and through the press to an exit end thereof, a pair of guide rails extending along the die guide, a slide including a pair of elongated shoes fitting slidably on the rails and a plurality of arched bridges connecting the shoes rigidly together, a plurality of sets of escapement pawls carried by and spaced along the slide, means for reciprocating the slide along the rails between a retracted position and a feed position, means operable jointly by the slide as it reaches its retracted position and a die positioned on the feed end of the guideway for actuating the slide-reciprocating means, means operable by the slide as it reaches its feed position for actuating a press-reciprocating means, a pair of stop arms movable into the press to stop a die in a predetermined position in the press, and cams carried by the shoes for actuating the arms.

4. A die feeding apparatus for a molding press comprising a die guide extending from feed end thereof to and through the press to an exit end thereof, a guideway extending along the die guide, a slide mounted slidably on the guideway, a plurality of sets of escapement pawls carried by and spaced along the slide, means for reciprocating the slide along the guideway between a retracted position and a feed position, means operable jointly by the slide as it reaches its retracted position and a die positioned on the feed end of the guideway for actuating the slide-reciprocating means, and means operable by the slide as it reaches its feed position for actuating a press-reciprocating means.

5. A die feeding apparatus for a molding press comprising a horizontal die guide extending from a feed end thereof to and through the press to an exit end thereof, a pair of guide rails extending along the die guide, a slide including a pair of elongated shoes fitting slidably on the rails and a plurality of arched bridges connecting the shoes rigidly together, a plurality of sets of escapement pawls carried by and spaced along the slide, means for reciprocating the slide along the rails between a retracted position and a feed position, means operable jointly by the slide as it reaches its retracted position and a die positioned on the feed end of the guideway for actuating the slide-reciprocating means to move the slide to its feed position, means operable by the slide as it reaches its feed position for actuating a press-reciprocating means, and means operable by the press for actuating the slide-reciprocating means to move the slide from its feed position to its retracted position.

References Cited in the file of this patent
UNITED STATES PATENTS

| | | |
|---|---|---|
| 1,330,172 | Crozier | Feb. 10, 1920 |
| 1,593,878 | Nagel | July 27, 1926 |
| 1,845,313 | McKinley | Feb. 16, 1932 |
| 1,958,422 | Dinzl | May 15, 1934 |
| 2,045,699 | Cramer | June 30, 1936 |
| 2,317,574 | Williams | Apr. 27, 1943 |
| 2,656,084 | Filander | Oct. 20, 1953 |